(12) United States Patent
Kopp et al.

(10) Patent No.: US 6,741,631 B2
(45) Date of Patent: May 25, 2004

(54) CUSTOMIZABLE APODIZED CHIRAL FIBER GRATING APPARATUS AND METHOD

(75) Inventors: Victor Il'ich Kopp, Flushing, NY (US); Azriel Zelig Genack, New York, NY (US)

(73) Assignee: Chiral Photonics, Inc., Clinton, NJ (US)

( * ) Notice: Subject to any disclaimer, the term of this patent is extended or adjusted under 35 U.S.C. 154(b) by 0 days.

(21) Appl. No.: 10/389,616

(22) Filed: Mar. 14, 2003

(65) Prior Publication Data

US 2004/0008938 A1 Jan. 15, 2004

Related U.S. Application Data

(60) Provisional application No. 60/364,953, filed on Mar. 14, 2002.

(51) Int. Cl.$^7$ .................................................. H01S 3/08
(52) U.S. Cl. .............................. 372/102; 372/6; 385/37
(58) Field of Search ............................ 372/6, 102, 98, 372/96; 385/37, 11

(56) References Cited

U.S. PATENT DOCUMENTS 4,427,717 A * 1/1984 Gauthier ................. 427/163.2

2002/0172461 A1 * 11/2002 Singer et al. ................. 385/37
2003/0118365 A1 * 6/2003 Ban et al. .................... 399/106

* cited by examiner

Primary Examiner—Leon Scott, Jr.
(74) Attorney, Agent, or Firm—Edward Etkin, Esq.

(57) ABSTRACT

A apodized chiral fiber grating consists of a chiral fiber with a variable effective grating strength along different regions of its length, such that the effective grating strength gradually increases from one end of the chiral fiber until a peak effective grating strength is reached and then gradually decreases at the same rate towards the other end of the fiber. Optionally, the effective grating strength remains stable for a portion of the fiber before decreasing. Other forms of grating strength variations in different regions of the chiral fiber are also contemplated. The effective grating strength variation produces an apodized chiral fiber that possesses desirable characteristics that greatly reduce or eliminate the sidelobes in the fiber's spectral response. The effective grating strength is varied by modulating the pitch of the apodized chiral fiber along different regions of its length in accordance with a mathematical expression, such as for example: linear, polynomial, sinusoidal or quasi-sinusoidal function. Advantageously, the inventive apodized chiral fiber is customizable to any application by selectively controlling the pitch variation along the different regions.

14 Claims, 6 Drawing Sheets

CUSTOMIZABLE APODIZED CHIRAL FIBER GRATING APPARATUS AND METHOD

CROSS REFERENCE TO RELATED APPLICATIONS

The present patent application claims priority from the commonly assigned U.S. provisional patent application S/N 60/364,953 entitled "Customizable Apodized Chiral Fiber Grating" filed Mar. 14, 2002.

FIELD OF THE INVENTION

The present invention relates generally to fiber grating type structures, and more particularly to apodized fiber gratings implemented in a chiral fiber structure.

BACKGROUND OF THE INVENTION

With the proliferation of fiber optic communication lines, the issue of undesirable sidelobes in the spectral response of uniform fiber gratings, resulting in channel crosstalk, has become an important consideration, especially for wave division multiplexing (WDM) applications. The main peak in the reflection spectrum of a uniform chiral fiber grating is accompanied by a series of undesirable sidelobes at adjacent wavelengths. Eliminating these sidelobes by apodizing the reflection spectrum of the grating is crucial in many applications.

A number of solutions to this problem have been proposed over the years. The most successful solution involves the implementation of a nonuniform refractive index modulation at each end of the apodized fiber Bragg grating (FBG) resulting in a sharp spectral response with suppressed sidelobes.

However, the apodized FBG suffers from a number of drawbacks. FBGs are typically fabricated by irradiating a UV sensitive material with UV light through a pre-designed phase mask. The phase mask determines the periodicity and size of the resulting FBG and thus must be carefully designed to provide the desired apodization to an FBG. Because different optical fibers with different lengths and periods require apodized FBGs having different variations of the index of refraction to suppress the sidelobes, a specific phase mask must be designed for each optical fiber line. Finally, due to the fact that apodized FBGs use UV-sensitive materials, the choice for materials is limited.

It would therefore be desirable to provide an advantageous apodized fiber grating that is easy and inexpensive to manufacture and that may be readily customized for any desired application. It would also be desirable to provide an apodized fiber grating that could be made from a broad range of optical materials.

BRIEF DESCRIPTION OF THE DRAWINGS

In the drawings, wherein like reference characters denote elements throughout the several views.

SUMMARY OF THE INVENTION

The present invention is directed to a novel apodized chiral fiber Bragg grating (hereinafter "apodized chiral fiber") that is based on a specially configured optical fiber structure having advantageous optical properties similar to a cholesteric liquid crystal (CLC) structure. The optical fiber structure used in the inventive apodized chiral fiber achieves optical properties similar to a CLC structure because it satisfies the requirement that in a CLC structure the pitch of the structure is twice its period. This is accomplished by using a chiral fiber structure having geometric birefringence with 180 degree symmetry. The desirable CLC optical properties may be obtained by imposing two identical coaxial helices along a fiber structure, where the second helix is shifted by half of the structure's pitch forward from the first helix. Such structures are described in greater detail in the U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", and "Helical Fiber Bragg Grating" that are all hereby incorporated by reference herein in their entirety.

Essentially, the inventive apodized chiral fiber is similar in construction to a standard helical fiber Bragg grating disclosed in the above-incorporated patent applications, except that the inventive apodized chiral fiber has several regions with varying pitch thereby leading to a variation in the coupling of a particular wavelength to the grating. Preferably, this variation in the effective grating strength is gradual. The effective grating strength preferably increases from one end of the chiral fiber until a peak coupling is reached near the central potion of the material and then gradually decreases at the same rate towards the other end of the fiber. Optionally, the pitch remains stable in a central portion of the fiber. This produces a peak in the effective grating strength at a wavelength resonant with that structure. Beyond this central portion of the fiber, the effective grating strength decreases. These arrangements produce an apodized chiral fiber that possesses desirable characteristics that greatly reduce or eliminate the sidelobes in the fiber's spectral response. Similar apodized chiral materials may be produced by appropriate variation of the pitch of any chiral structure, including planar cholesteric liquid crystals. In addition, other shapes of effective grating strength variations may be implemented as a matter of design choice, for example, decreasing and then increasing effective grating strength along the length of the chiral structure.

The effective grating strength is maximal when the pitch of a chiral fiber remains constant, while variations of the pitch of a portion of the chiral fiber reduces the effective grating strength in that region in a manner related to the magnitude of the variation from the constant pitch. Thus, in accordance with the present invention, the variation in the effective grating strength is accomplished by modulating the pitch of the chiral fiber along different regions of its length in accordance with a mathematical expression, such as for example: a linear, polynomial, sinusoidal or quasi-sinusoidal function.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The present invention is directed to an advantageous apodized chiral fiber grating (hereinafter "apodized chiral fiber") that provides significant advantages over previously known apodized FBGs. Before describing the inventive apodized chiral fiber in greater detail, it would be advantageous to provide an explanation of the scientific principles behind chiral fibers. A chiral fiber is a novel structure that mimics CLCs—the cholesteric periodic photonic band gap structure—in a fiber form. A commonly assigned co-pending U.S. Patent Application entitled "Chiral Fiber Grating" (hereinafter "CFG patent") which is hereby incorporated by reference in its entirety, disclosed the advantageous implementation of the essence of a cholesteric periodic photonic band gap (hereinafter "PBG") structure in an optical fiber. This novel approach captured the superior optical properties of CLCs while facilitating the manufacture of the structure as a continuous (and thus easier to implement) process.

Essentially, the apodized chiral fiber of the present invention is an advantageously modified form of the chiral fiber disclosed in the CFG patent—i.e., it is a chiral fiber having a nonuniform effective grating strength along both ends of the fiber. The inventive apodized chiral fiber maintains various properties of a CLC including, for example, polarization sensitivity. While the apodized chiral fiber grating of the present invention is described with reference to the above-incorporated embodiments of inventive optical fibers having CLC-like properties derived from their helical or double helical structures, it should be noted that the inventive apodized chiral fiber may be advantageously constructed utilizing any optical fiber having 180 degrees reflection symmetry about a plane parallel to the fiber axis which passes through its center. Furthermore, it should be noted that the various advantageous CLC-related techniques disclosed in the above-incorporated commonly assigned co-pending U.S. Patent Applications may be readily adapted to and advantageously utilized in conjunction with the inventive apodized chiral fiber as a matter of design choice. Similar apodized chiral materials may be produced by appropriate variation of the pitch of any chiral structure, including planar cholesteric liquid crystals without departing from the spirit of the invention.

Figure 1:
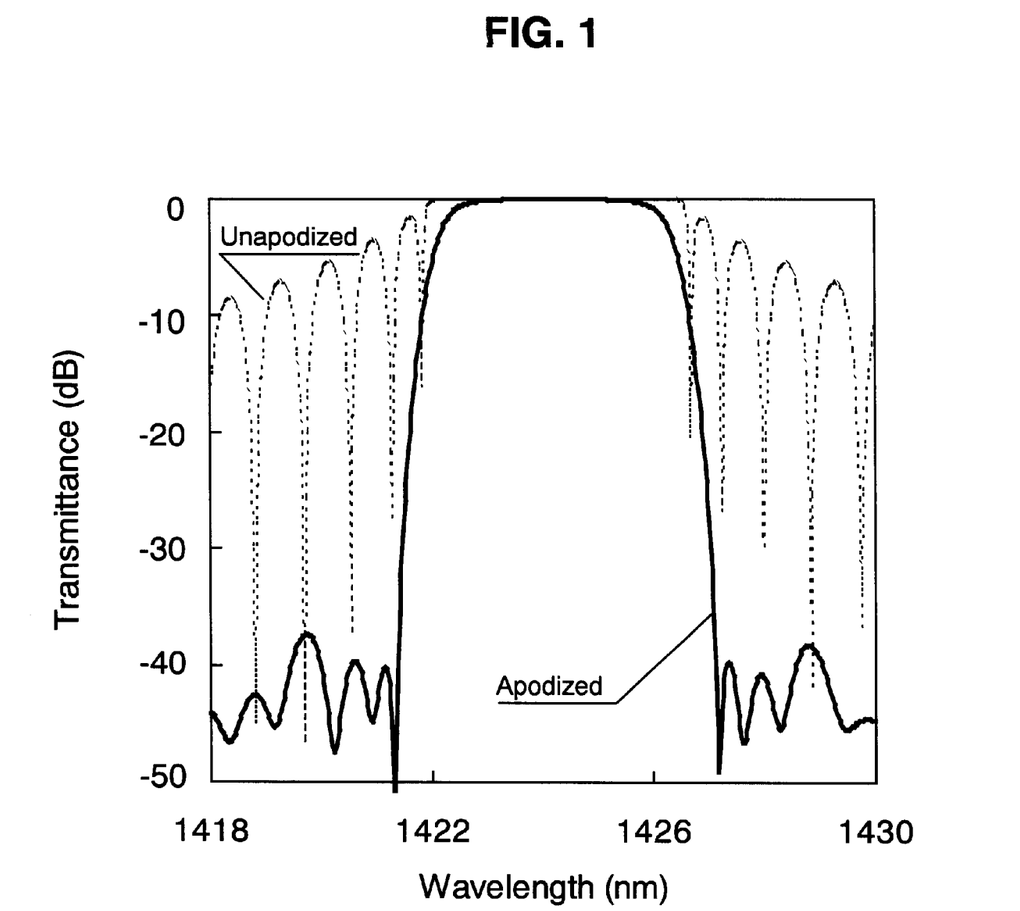
FIG. 1 is a comparative graph diagram of superimposed exemplary reflection spectra from apodized and unapodized fiber gratings.
Figure 2:
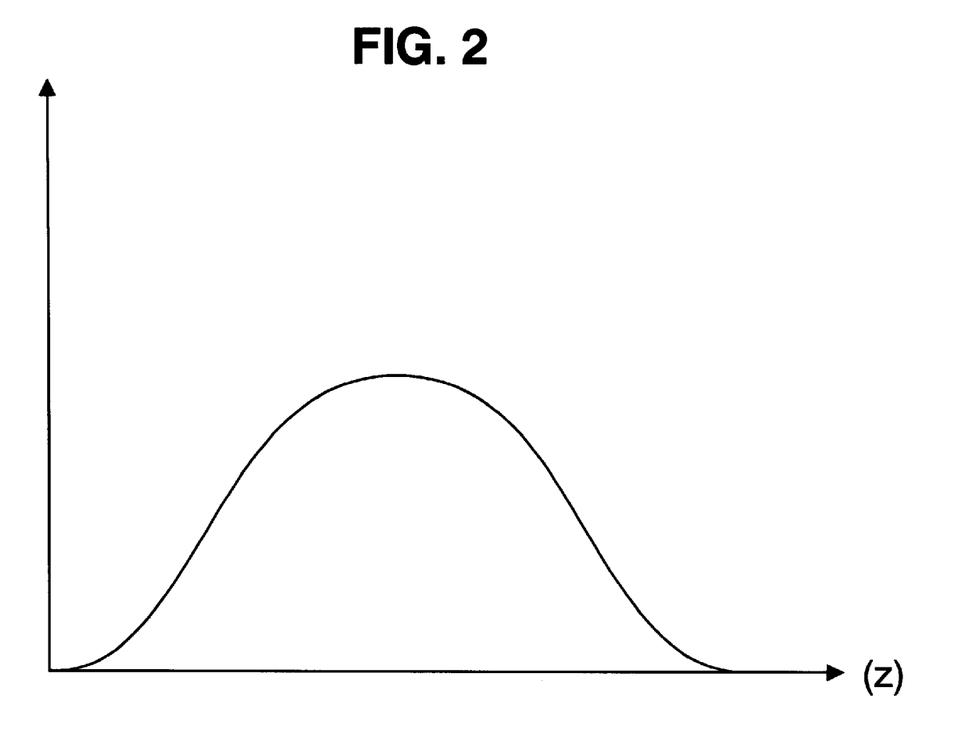
FIG. 2 is a schematic diagram of an exemplary desirable distribution of effective grating strength in the apodized chiral fiber grating of the present invention.

In order to achieve apodization and thus eliminate undesirable sidelobes, the strength of the inventive fiber grating is preferably configured to gradually increase from one end of the fiber, then remain substantially uniform and finally gradually decrease toward the other end of the fiber. An exemplary graph of one possible desirable effective grating strength distribution along the fiber length is shown in FIG. 2. It should be noted, that the shape of the grating strength distribution may be customized as a matter of design choice for specific apodization applications without departing from the spirit of the invention. For example, the effective grating strength may increase to a peak value and then decrease immediately, or, alternately, the effective grating strength may remain at the peak value for a portion of the fiber before decreasing.

In addition, other arrangements of effective grating strength modulation along the chiral fiber length (for example, gradually decreasing effective grating strength to a minimum value and then gradually increasing again) may be configured as a matter of design choice for specific applications without departing from the spirit of the invention.

In accordance with a preferred embodiment of the present invention, the effective grating strength is preferably increased and subsequently decreased in accordance with a mathematical expression, for example: a linear, polynomial, sinusoidal or quasi-sinusoidal function. For example, the effective grating strength along the fiber may be changed in accordance with a function that may be expressed as follows:

$$\text{Angle}(z) = 2\pi z/P + 1.204 * (0.65 + (1-0.65) * \cos(2\pi z/L)) * \sin(2\pi z/(1.6*P)),$$

where z is a coordinate along the longitudinal axis of the chiral fiber structure, Angle(z) is the angle of rotation along the chiral structure (i.e. the angle of a local dielectric tensor), and P is the average structure pitch, and L is the structure length.

Figure 3:
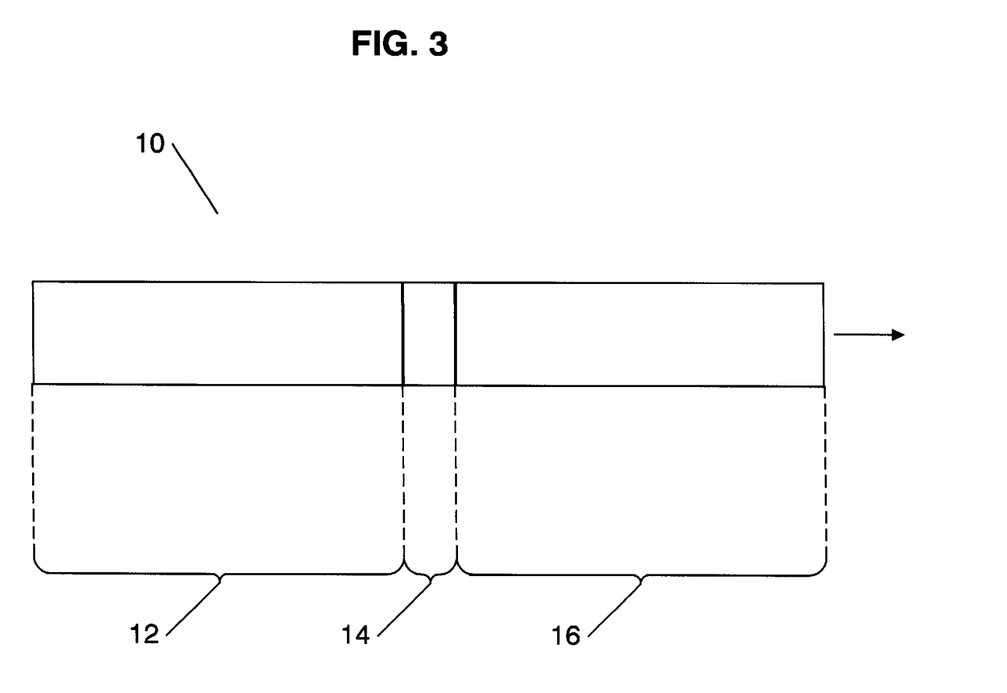
FIG. 3 is a schematic diagram of a first embodiment of the apodized chiral fiber grating of the present invention.

Referring now to FIG. 3, an exemplary inventive apodized chiral fiber 10 is shown, where the effective strength of the grating is changed by modulating the pitch along the fiber. The apodized chiral fiber 10 includes a first region 12, a second region 14, and a third region 16. In accordance with the present invention, the effective grating strength preferably increases from the first end of the fiber 10 until it peaks at a first edge of the region 14, remains at a constant peak value through the region 14 of uniform pitch, and then gradually decreases from the second region of the region 14 through the region 16 until it returns to its minimum value at the second end of the fiber 10. The length of region 14 and the mathematical expression that controls the increase and decrease of the effective grating strength (in regions 12 and 16, respectively) may be selected as a matter of design choice, without departing from the spirit of the invention, to customize the spectral apodization characteristics of the fiber 10 for specific applications.

Figure 4:
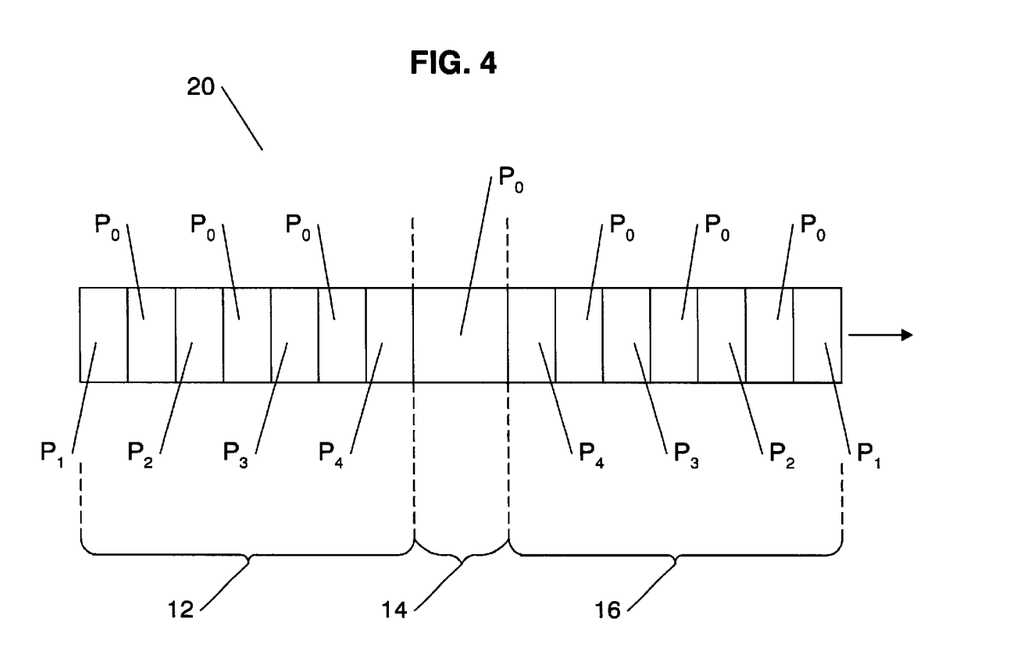
FIG. 4 is a schematic diagram of an exemplary embodiment of the apodized chiral fiber grating of FIG. 3.

Referring now to FIG. 4, an exemplary embodiment of the apodized chiral fiber 10 is shown as an apodized chiral fiber 20. The effective grating strength is at a maximum value when the pitch of a chiral fiber grating remains constant, while oscillation of the pitch in a portion of the chiral fiber reduces the effective grating strength in that region in a manner which increases as the magnitude of the variation from the constant pitch increases. The exemplary apodized chiral fiber 20 has an oscillating pitch modulation along the regions 12 and 16 while the pitch remains stable at a value $P_0$ in the middle region 14. The value of the pitch changes as follows: in region 12: $P_1$, $P_0$, $P_2$, $P_3$, $P_0$, $P_4$; in region 14 of the grating 20: remains at $P_0$; in region 16: $P_4$, $P_0$, $P_3$, $P_0$, $P_2$, $P_0$, $P_1$, where $P_0$, $P_1$, $P_2$, $P_3$, and $P_4$, are various values of the pitch of the apodized chiral fiber 20, selected as a matter of design choice in accordance with the following expression:

$$P_1 > P_2 > P_3, > P_4 > P_0$$

Figure 5:
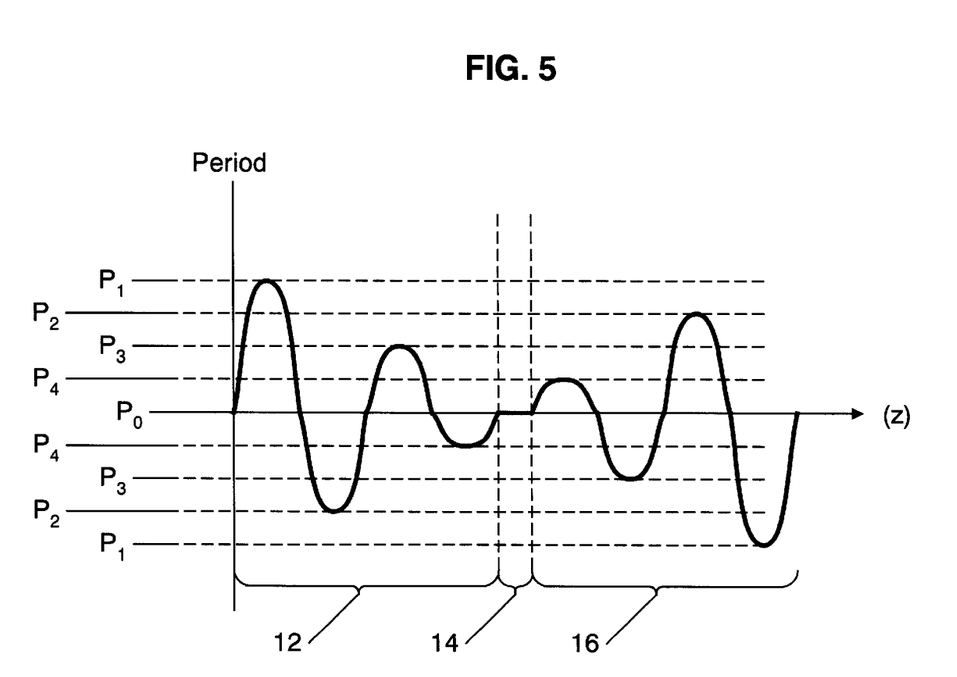
FIG. 5 is a graph diagram of an oscillating modulation of the pitch of the exemplary apodized chiral fiber grating of FIG. 4.

Referring now to FIG. 5, an exemplary graph of the magnitude of the oscillation in the pitch is shown. The attenuating magnitude of oscillation of the pitch in the region along the (z) axis in the direction of region 14 corresponds to an increasing grating strength, whereas increasing magnitude of pitch oscillation in region 16 in the direction away from region 14 corresponds to a decreasing effective grating strength, with the effective grating strength peaking in region 14 where the pitch is constant at $P_0$. The desired apodization of the spectral characteristics of the apodized chiral fiber 20 can be determined as a matter of design choice by selecting the magnitude of the oscillation in the pitch (e.g. the magnitude of the pitch change and number of pitch changes in regions 12 and 16) as well as the length of the region 14. It should be noted that other arrangements for varying the pitch in regions 12 and 16 may be used as a matter of design choice without departing from the spirit of the invention.

Returning now to FIG. 3, while most previously known apodized fiber gratings are fabricated from a pre-designed phase mask, the inventive apodized grating 10 can be readily customized by varying the effective grating strength in accordance with desired parameters for various applications.

While the basic functionality of the apodized chiral fiber 10 appears to mimic a standard apodized FBG, one of the essential points of the invention is the configuration of the apodized chiral fiber 10 during fabrication. The above-incorporated "Apparatus and Method for Fabricating Helical Fiber Bragg Gratings" U.S. Patent Application discloses a novel system and method of fabricating chiral fibers by heating a portion of an optical fiber with a non-cylindrical core and then twisting the fiber while drawing it—thus producing a chiral fiber with a uniform pitch.

Figure 6:
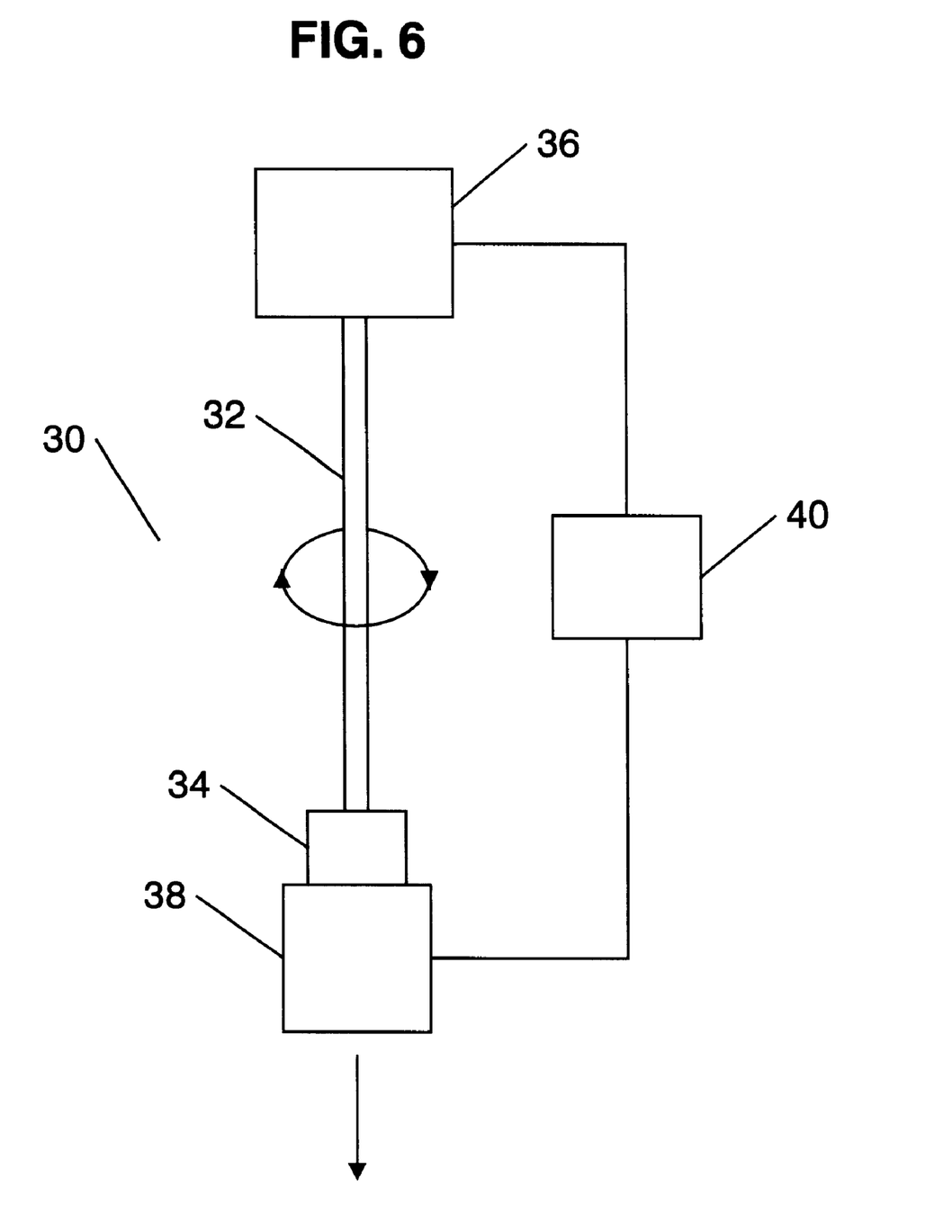
FIG. 6 is a schematic diagram of an exemplary apparatus for fabricating and configuring the inventive apodized chiral fiber grating of FIG. 3.

Referring now to FIG. 6, a simplified diagram of an exemplary fabrication device 30 for fabricating apodized chiral fiber gratings is shown. The fabrication device 30 comprises a retaining unit 36 for holding one end of an optical fiber workpiece 32, while a drawing unit 38 pulls the fiber workpiece 32 at the same time as a twisting unit 34 twists the fiber workpiece 32 around the fiber's longitudinal (z) axis. When the drawing and twisting occurs at a stable predefined speed, an ordinary chiral fiber is produced. However, in accordance with the present invention, one or more of (a) the drawing speed of the drawing unit 38, (b) the acceleration of the drawing unit 38, (c) the twisting speed of the twisting unit 34, and (d) the acceleration of the twisting unit 34, may be selectively varied during the fabrication process to produce the apodized chiral fiber 10 with a variation in pitch in regions 12 and 16 governed by the variation in the drawing and/or twisting speeds and/or accelerations.

For example, increased drawing speed during a portion of the fabrication process, while the twisting speed is maintained, will produce an increased pitch in one section of one of the regions 12 or 16 of the apodized chiral fiber 10 fabricated from the fiber workpiece 32. Similarly, maintaining the drawing speed while increasing the twisting speed will decrease the pitch in another section of one of the regions 12 or 16 of the apodized chiral fiber 10. These speeds may be controlled by a programmable computer system 40, and thus a variety of custom-made apodized chiral fibers may be easily produced for any application and from any optical fiber material. For example, an apodized chiral fiber may be easily fabricated for a custom fiber length by simply changing program instructions in the control computer 38. Previously it would have been necessary to design a special phase mask for each new application.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An apodized chiral fiber grating comprising:
   a first longitudinal region having a first end and a second end, and having a first effective grating strength variation therein; and
   a second longitudinal region, sequentially positioned to said first region, and having a third end in contact with said second end and a fourth end, and having a second effective grating strength variation therein, thereby producing desirable spectral characteristics for the apodized chiral fiber grating.

2. The apodized chiral fiber grating of claim 1, further comprising a third longitudinal region, having a fifth end and a sixth end, positioned between said first and second regions such that said fifth end is in contact with said second end and said sixth end is in contact with said third end, said third region having uniform effective grating strength, at a predefined effective grating strength value, between said fifth and sixth ends.

3. The apodized chiral fiber grating of claim 1, wherein said first grating strength variation is selected from the consisting of group:
   (1) increasing effective grating strength from an initial effective grating strength value, along a longitudinal axis from said first end to said second end until said predefined effective grating strength value is reached; and
   (2) decreasing effective grating strength from said predefined effective grating strength value, along a longitudinal axis from said first end to said second end until said initial effective grating strength value is reached.

4. The apodized chiral fiber grating of claim 1, wherein said second grating strength variation is selected from the consisting of group:
   (1) increasing effective grating strength from an initial effective grating strength value, along a longitudinal axis from said third end to said fourth end until said predefined effective grating strength value is reached; and
   (2) decreasing effective grating strength from said predefined effective grating strength value, along a longitudinal axis from said third end to said fourth end until said initial effective grating strength value is reached.

5. The apodized chiral fiber grating of claim 1, wherein at least one of said first and said second grating strength variations is configured in accordance with a predetermined mathematical expression.

6. The apodized chiral fiber grating of claim 5, wherein said predetermined mathematical expression is selected from a group comprising: a linear, polynomial, sinusoidal, and quasi-sinusoidal function.

7. The apodized chiral fiber grating of claim 5, wherein an angle of a local dielectric tensor for said first second and third regions is defined by a single predetermined mathematical expression.

8. The apodized chiral fiber grating of claim 1, comprising a pitch along a length of the grating, wherein at least one of said first and said second grating strength variations are imposed in a corresponding respective said first or said second region by modulating said pitch in respective said first and said second regions.

9. A method for producing an apodized chiral fiber grating comprising the steps of:
(a) providing a chiral fiber grating comprising a first longitudinal region having a first end and a second end, and a second longitudinal region sequentially positioned to said first region, having a third end in contact with said second end, and a fourth end;
(b) imposing a first effective grating strength variation in said first region; and
(c) imposing a second effective grating strength variation in said second region, thereby producing desirable spectral characteristics for the apodized chiral fiber grating.

10. The method of claim 9, wherein said step (b) comprises the step of: increasing effective grating strength from an initial effective grating strength value, along a longitudinal axis of the chiral fiber grating from said first end to said second end, until a predefined effective grating strength value is reached.

11. The method of claim 9, wherein said step (b) comprises the step of: decreasing effective grating strength from said predefined effective grating strength value, along the longitudinal axis from said first end to said second end, until said initial effective grating strength value is reached.

12. The method of claim 9, wherein said step (c) comprises the step of: increasing effective grating strength from an initial effective grating strength value, along a longitudinal axis of the chiral fiber grating from said third end to said fourth end, until a predefined effective grating strength value is reached.

13. The method of claim 9, wherein said step (c) comprises the step of: decreasing effective grating strength from said predefined effective grating strength value, along the longitudinal axis from said third end to said fourth end, until said initial effective grating strength value is reached.

14. The method of claim 9, further comprising the steps of:
(d) providing a third longitudinal region, having a fifth end and a sixth end, positioned between said first and second regions such that said fifth end is in contact with said second end and said sixth end is in contact with said third end; and
(e) maintaining said effective grating strength at said predefined effective grating strength value between said fifth and sixth ends.

* * * * *